UNITED STATES PATENT OFFICE.

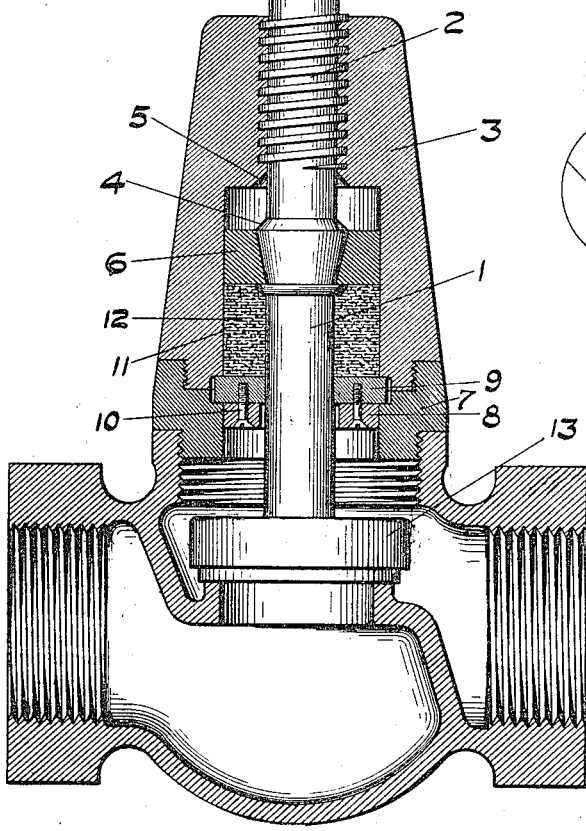

JOHN L. McKENZIE, OF BEECH GROVE, INDIANA, ASSIGNOR, BY DIRECT AND MESNE ASSIGNMENTS, TO THE M. T. R. MANUFACTURING COMPANY, OF INDIANAPOLIS, INDIANA, A CORPORATION OF INDIANA.

BEARING-CASING FOR VALVE-STEMS AND SIMILAR MOVABLE PARTS.

1,268,591.  Specification of Letters Patent.  Patented June 4, 1918.

Application filed November 6, 1916. Serial No. 129,787.

*To all whom it may concern:*

Be it known that I, JOHN L. McKENZIE, a citizen of the United States, residing at Beech Grove, Marion county, and State of Indiana, have invented and discovered certain new and useful Improvements in Bearing-Casings for Valve-Stems and Similar Movable Parts, of which the following is a specification.

My invention relates to fluid excluding bearing casings for the stems of valves and piston rods, etc., and is designed to take the place of the usual stuffing box provided with packings and glands.

The object of the invention is to provide a packless and leak proof bearing for the stems, rods or similar reciprocable supporting means of movable closures, such as valves and pistons, and a construction thereof in which friction is reduced to a minimum, thereby obtaining ease of operation of the valve or other member carried by the stem.

With these objects in view, my invention is embodied in preferable form in the construction and arrangement hereinafter described and illustrated in the accompanying drawings.

In these drawings, Figure 1 is a vertical sectional view through a valve and valve stem showing my invention applied thereto and Fig. 2, a section through the split expansible closure ring at one end of the bearings.

Referring to the drawings, 1 indicates the stem of a valve and 2 threads thereon, such as are customarily employed in globe valves. This stem is threaded into a hollow casing 3.

In this invention all the contacting, closing surfaces of the fluid excluding construction are of metal. Referring to the closure means at the outer end of the casing, a tapered or a beveled ground cone shoulder 4 is formed on the outer end of a tapered head carried by the stem 1, and this surface is adapted to bear against the ground concave seat 5 formed in the casing 3, whereby a tight joint is formed between the shoulder and seat when the valve is opened and the stem moved outward.

On the said tapered stem head is mounted so as to move with said stem, an expansible passageway-closing member, consisting of a split metallic ring 6 having its outer face adapted to slide against the inner surface of the wall of the casing 3.

Secured to the lower end of the casing 3, is a clamping nut 7, adapted to be tightly screwed into the casing, and having a broken joint therewith providing two separated ground contact surfaces. Between the inner surface of this clamping nut and the outer surface of the stem is mounted a metallic ring 8. This ring has a tight close fit against the surface of the clamping nut for the purpose of preventing the passage of steam, water or other fluid and is spaced from the surface of the stem by a slight clearance to permit of the expansion of the ring under heat without producing undue frictional bearing against the stem. This ring is made of a metal alloy adapted to lessen friction, to permit of an expansion tightly against the wall of the clamping nut and yet to limit such expansion to a point that will prevent expansion against the stem. To this end, the ring consists preferably of an alloy of aluminum, brass and Babbitt metal.

Beyond and in contact with the ring 8, is a second fixed closing ring 9, made of a metal alloy of the same composition as the ring 8. The part 9 is larger in diameter than the ring 8 so as to break joint therewith at the outer edges of the rings and is mounted in recesses formed in the casing 3 and nut 7 and firmly clamped to its seat at the end of the casing by the nut. The ring 9 has a fluid tight fit against the stem 1 and is spaced by a slight clearance from the surface of the nut 7 and casing 3 to permit of expansion of the ring.

The two rings 8 and 9 are joined by screws 10 or other securing means and such rings together constitute a fluid tight, antifriction closure element for the inner end of the stem bearing, having alternate tight and loose surfaces on their inner and outer circumferences respectively. If desired, and such is the preferable construction, the two rings may be made in one piece, with the alternate clearance and tight fit, permitting expansion of each part in one direction, and providing the broken joint between the two parts or sections.

The expansible, movable ring 6 and the fixed closure member consisting of the parts 8 and 9 form between them a chamber 11. In this chamber may be placed a sealing fluid 12 consisting preferably of oil containing suspended particles of metal and other material designed to seal the joints and movable contacting surfaces. This sealing fluid may be dispensed with, however, if desired, although it has been found to be very effectual in sealing joints and preventing leaks not only in valves but also in connection with other constructions subject to fluid pressure.

The device is shown as applied to an ordinary globe valve in which 13 is the valve proper.

It will be seen that the construction above described not only dispenses with the usual packings and glands therefor, but provides a bearing closure which is practically leak proof and yet in which friction between the reciprocating parts is reduced to a minimum thereby obtaining ease of operation which is a point of great importance with valves having large stems with diameters, for example, of from three to eight inches.

Having thus described my invention what I claim is:

1. Fluid excluding bearing means for movable stems or rods connected to heads which receive fluid pressure, said means including a casing having an expansible closure member located between the stem or rod and the casing and made of a metal which is different from that of the movable stem or rod and which has a higher coefficient of expansion, the said member having alternate spaced and tight-fitting surfaces on its inner and outer circumferences adjacent to the movable stem or rod and said casing, respectively.

2. Fluid excluding bearing means for reciprocable stems and rods, including a casing and having a metallic closure member between the stem and casing which is made of a metal having a higher co-efficient expansion than the metal of the stem or rod, and which comprises two sections of different diameters providing a broken joint between said member and the casing, one of said sections having a clearance from the casing and a tight fit against the stem and the other section having a clearance from the stem and a tight fit against the casing.

3. In means of the class described including a casing and a movable stem or rod, a split expansible ring fixed on the stem or rod near one end of the casing in combination with a closure member fixed to the casing at the other end and made of expansible metal and mounted to permit radial expansion.

4. In combination with a movable stem or rod and a casing therefor, a closure member surrounding the stem or rod and clamped to the casing, said member being made of expansible metal and having two concentric sections of different diameters providing broken joints between them and the casing.

5. In combination with a movable stem or rod, a casing therefor, a metallic closure member surrounding the stem or rod and clamped to the casing, said member having two sections of different diameters forming a broken joint between them and the casing and a split expansible metallic closure ring carried by the movable stem or rod.

6. In combination with a movable stem or rod and a casing therefor, said stem having a metal head provided with a ground bevel contact face and a complementary seat in the casing to receive said face, and a split expansible metal closure ring mounted on said stem and bearing against the side wall of the casing and adapted to seat against the end wall thereof adjacent said bevel seat.

7. In combination with a movable stem or rod and a casing therefor, a metallic closure member surrounding the stem or rod and clamped to the casing near one end of the latter, a split expansible metallic ring carried by the stem or rod and a ground cone head on the stem or rod adapted to seat against the other end of the casing.

8. In combination with a movable rod or stem, a casing, a smooth contact bearing and closure member surrounding said stem or rod and clamped to the casing near one end of the latter, a closure member having a similar contact against the casing and fixed on the stem or rod adjacent the other end of the casing and movable with said stem or rod, said closure members forming a closed chamber between them, and a joint closing fluid composition in said chamber.

In witness whereof, I have hereunto set my hand and seal at Indianapolis, Marion county, Indiana, this 1st day of November, A. D. nineteen hundred and sixteen.

JOHN L. McKENZIE. [L. S.]

Witnesses:
 A. C. RICE,
 H. P. DOOLITTLE.

Copies of this patent may be obtained for five cents each, by addressing the "Commissioner of Patents, Washington, D. C."